US009684393B2

(12) United States Patent
Yagihashi et al.

(10) Patent No.: US 9,684,393 B2
(45) Date of Patent: Jun. 20, 2017

(54) DISPLAY CONTROL DEVICE, COMMUNICATION TERMINAL, DISPLAY CONTROL METHOD, AND COMPUTER-READABLE RECORDING MEDIUM ON WHICH PROGRAM IS RECORDED

(71) Applicant: NEC CASIO Mobile Communications, Ltd., Nakahara-ku, Kawasaki-shi, Kanagawa (JP)

(72) Inventors: Ayumu Yagihashi, Tokyo (JP); Yumi Katou, Tokyo (JP); Hiroyuki Aoki, Tokyo (JP); Atsuhiko Murayama, Tokyo (JP); Seiji Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 14/423,194

(22) PCT Filed: Aug. 29, 2013

(86) PCT No.: PCT/JP2013/073170
§ 371 (c)(1),
(2) Date: Feb. 23, 2015

(87) PCT Pub. No.: WO2014/034789
PCT Pub. Date: Mar. 6, 2014

(65) Prior Publication Data
US 2015/0220166 A1    Aug. 6, 2015

(30) Foreign Application Priority Data
Aug. 31, 2012    (JP) ................................. 2012-192220

(51) Int. Cl.
*G06F 3/0362*    (2013.01)
*H04M 1/02*    (2006.01)
(Continued)

(52) U.S. Cl.
CPC ............ *G06F 3/0362* (2013.01); *G06F 3/011* (2013.01); *G06F 3/1423* (2013.01);
(Continued)

(58) Field of Classification Search
CPC ...... G06F 3/011; G06F 3/0362; G06F 3/1423; G09G 2340/0492; G09G 3/2092
See application file for complete search history.

(56) References Cited

U.S. PATENT DOCUMENTS

2008/0227505 A1    9/2008    Jang et al.
2009/0184935 A1*   7/2009    Kim .................... G06F 3/0416
                                                345/173
(Continued)

FOREIGN PATENT DOCUMENTS

CN    1799023 A    7/2006
CN    101943935 A    1/2011
(Continued)

OTHER PUBLICATIONS

International Search Report for PCT Application No. PCT/JP2013/073170, mailed on Dec. 10, 2013.
(Continued)

*Primary Examiner* — Latanya Bibbins

(57) ABSTRACT

A display control device (500) is the display control device (500) that controls output of display data to a plurality of display units that are arranged on different surfaces of a case, comprising a posture detection unit (510), a visibility state determination unit (520), and a display data output unit (530). The posture detection unit (510) detects a posture of the case. The visibility state determination unit (520) determines a display unit that is visually recognizable to the user from among the plurality of display units according to the posture of the case detected by the posture detection unit (510). The display data output unit (530) outputs the display
(Continued)

data to the display unit that the visibility state determination unit (520) determined as visually recognizable to the user.

2 Claims, 15 Drawing Sheets

(51) Int. Cl.
    *G06F 3/01*     (2006.01)
    *G09G 3/20*     (2006.01)
    *G06F 3/14*     (2006.01)

(52) U.S. Cl.
    CPC ........ *G09G 3/2092* (2013.01); *H04M 1/0214* (2013.01); *H04M 1/0245* (2013.01); *G09G 2340/0492* (2013.01); *H04M 2250/12* (2013.01); *H04M 2250/16* (2013.01)

(56) References Cited

U.S. PATENT DOCUMENTS

2010/0321275 A1* 12/2010 Hinckley .............. G06F 1/1618
                                                              345/1.3

2011/0239142 A1* 9/2011 Steeves .................... G06F 3/14
                                                              715/764
2012/0176353 A1   7/2012 Ishii

FOREIGN PATENT DOCUMENTS

| | | |
|---|---|---|
| EP | 2479967 A1 | 7/2012 |
| JP | 2000-307719 A | 11/2000 |
| JP | 2003-219024 A | 7/2003 |
| JP | 2003-273968 A | 9/2003 |
| JP | 2007-281864 A | 10/2007 |
| JP | 2007-329713 A | 12/2007 |
| JP | 2011-166630 A | 8/2011 |
| JP | 2011-203302 A | 10/2011 |
| JP | 2012-099908 A | 5/2012 |

OTHER PUBLICATIONS

Chinese Office Action for CN Application No. 2013800453081 issued on Nov. 4, 2015 with English Translation.
Extended European Search Report for EP Application No. EP13831999.1 dated Apr. 11, 2016.

* cited by examiner

Fig.3

| CONFIGURATION | UPPER SIDE DISPLAY UNIT | VISIBILITY STATE OF DISPLAY UNIT | |
|---|---|---|---|
| | | FIRST | SECOND |
| 1 | FIRST | × | × |
| | SECOND | × | × |
| 2 | FIRST | ○ | ○ |
| | SECOND | ○ | ○ |
| 3 | FIRST | ○ | × |
| | SECOND | × | ○ |

Fig.4

| DISPLAY ITEM | SECRET MODE | |
|---|---|---|
| | CANCELLED | SET |
| INCOMING CALL MESSAGE | DISPLAY | DISPLAY |
| INCOMING CALL TIME AND DATE | DISPLAY | DISPLAY/NON-DISPLAY |
| CALLER'S NAME | DISPLAY | DISPLAY/NON-DISPLAY |
| CALLER'S TELEPHONE NUMBER | DISPLAY | DISPLAY/NON-DISPLAY |
| CLASSIFICATION | DISPLAY | NON-DISPLAY |
| COMPANY NAME/ORGANIZATION NAME | DISPLAY | NON-DISPLAY |
| DEPARTMENT NAME | DISPLAY | NON-DISPLAY |
| POSITION | DISPLAY | NON-DISPLAY |
| MEMO | DISPLAY | NON-DISPLAY |

Fig.5

| DISPLAY ITEM | SECRET MODE | |
|---|---|---|
| | CANCELLED | SET |
| NEW MAIL MESSAGE | DISPLAY | DISPLAY |
| MAIL RECEPTION TIME AND DATE | DISPLAY | DISPLAY/NON-DISPLAY |
| CALLER'S NAME | DISPLAY | DISPLAY/NON-DISPLAY |
| CALLER'S TELEPHONE NUMBER | DISPLAY | DISPLAY/NON-DISPLAY |
| CLASSIFICATION | DISPLAY | NON-DISPLAY |
| COMPANY NAME/ORGANIZATION NAME | DISPLAY | NON-DISPLAY |
| DEPARTMENT NAME | DISPLAY | NON-DISPLAY |
| POSITION | DISPLAY | NON-DISPLAY |
| MEMO | DISPLAY | NON-DISPLAY |
| HEAD OF MAIN TEXT | DISPLAY | NON-DISPLAY |

Fig.8

| DISPLAY ITEM | DISPLAY UNIT | |
|---|---|---|
| | UPPER SIDE | LOWER SIDE |
| INCOMING CALL MESSAGE | DISPLAY | DISPLAY |
| INCOMING CALL TIME AND DATE | DISPLAY/NON-DISPLAY | DISPLAY |
| CALLER'S NAME | DISPLAY/NON-DISPLAY | DISPLAY |
| CALLER'S TELEPHONE NUMBER | DISPLAY/NON-DISPLAY | DISPLAY |
| CLASSIFICATION | NON-DISPLAY | DISPLAY |
| COMPANY NAME/ORGANIZATION NAME | NON-DISPLAY | DISPLAY |
| DEPARTMENT NAME | NON-DISPLAY | DISPLAY |
| POSITION | NON-DISPLAY | DISPLAY |
| MEMO | NON-DISPLAY | DISPLAY |

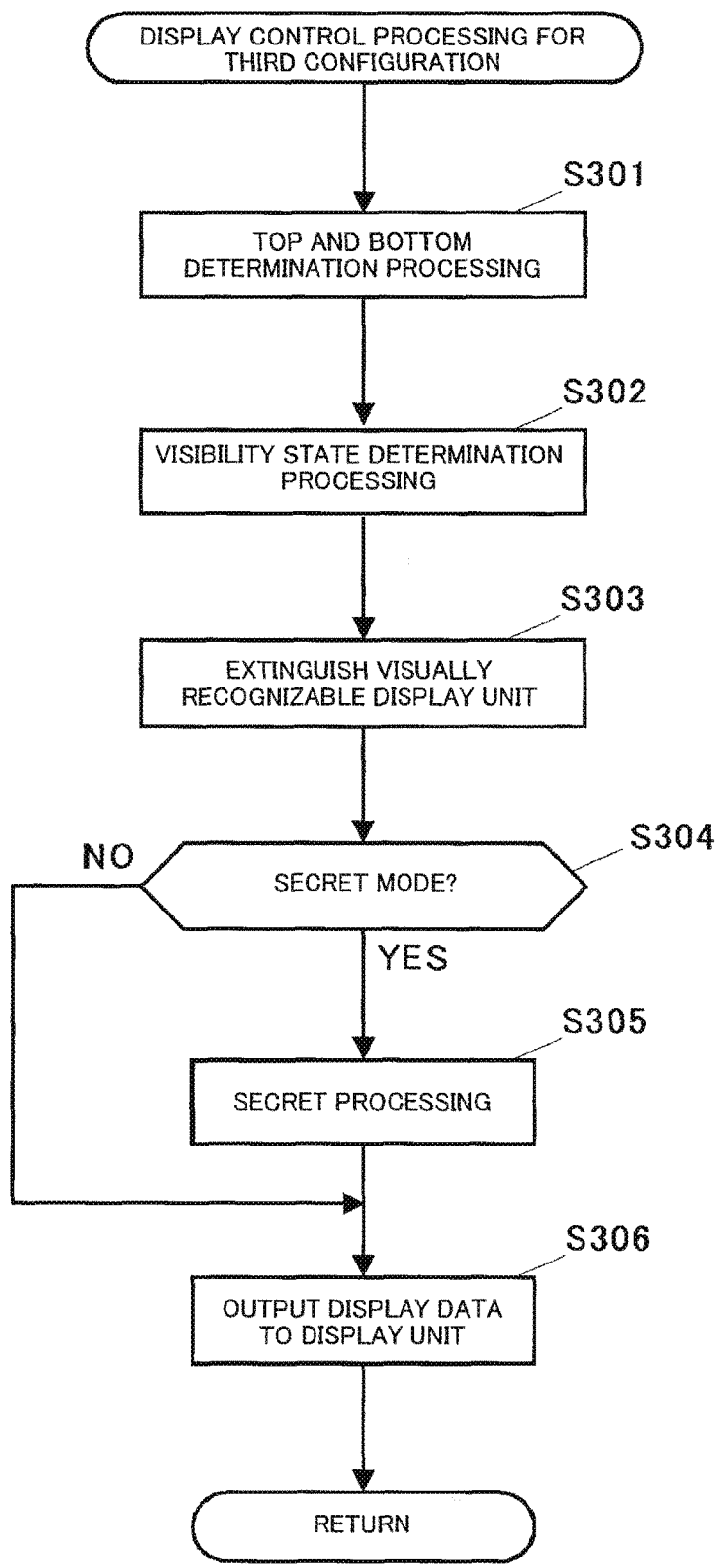

Fig.10

| DISPLAY ITEM | DISPLAY UNIT | |
| --- | --- | --- |
| | UPPER SIDE | LOWER SIDE |
| INCOMING CALL MESSAGE | DISPLAY | NON-DISPLAY |
| INCOMING CALL TIME AND DATE | DISPLAY/NON-DISPLAY | NON-DISPLAY |
| CALLER'S NAME | DISPLAY/NON-DISPLAY | NON-DISPLAY |
| CALLER'S TELEPHONE NUMBER | DISPLAY/NON-DISPLAY | NON-DISPLAY |
| CLASSIFICATION | NON-DISPLAY | NON-DISPLAY |
| COMPANY NAME/ORGANIZATION NAME | NON-DISPLAY | NON-DISPLAY |
| DEPARTMENT NAME | NON-DISPLAY | NON-DISPLAY |
| POSITION | NON-DISPLAY | NON-DISPLAY |
| MEMO | NON-DISPLAY | NON-DISPLAY |

DISPLAY CONTROL DEVICE, COMMUNICATION TERMINAL, DISPLAY CONTROL METHOD, AND COMPUTER-READABLE RECORDING MEDIUM ON WHICH PROGRAM IS RECORDED

This application is a National Stage Entry of PCT/JP2013/073170 filed on Aug. 29, 2013, which claims priority from Japanese Patent Application 2012-192220 filed on Aug. 31, 2012, the contents of all of which are incorporated herein by reference, in their entirety.

TECHNICAL FIELD

The present invention relates to a display control device, a communication terminal, a display control method, and a computer-readable recording medium on which a program is recorded.

BACKGROUND ART

There has been known a foldable cell-phone of which display unit is visually recognizable even when the cell-phone is in a closed state.

For example, PTL1 discloses a foldable cell-phone that includes three cases (the first to third cases) rotatably connected and two display units (the first display unit and the second display unit). This foldable cell-phone exposes the second display unit when the first case and the second case are in a folded state and exposes the first display unit and the second display unit when the second case and the third case are in a folded state. Therefore, a user can visually recognize at least one of the first display unit and the second display unit even when the foldable cell-phone is in a folded state.

CITATION LIST

Patent Literature

PTL1: Japanese Patent Application Laid-Open No. 2007-329713

SUMMARY OF INVENTION

Technical Problem

While the foldable cell-phone of the mentioned PTL1 is highly convenient for users as the display unit is visually recognizable to users in a closed state, information that the user desires not to be seen by a third person can be easily peeked at by a third person.

In consideration of the above problem, the objective of the present invention is to provide a display control device, a communication terminal, a display control method, and a computer-readable recording medium on which a program is recorded, which prevent information that is desired not to be seen by others from being peeked at while maintaining convenience for users.

Solution to Problem

To achieve the above-described objective, the display control device according to a first aspect of the present invention is a display control device that controls output of display data to a plurality of display units that are arranged on different surfaces of a case, comprising: a posture detection unit that detects a posture of the case; a visibility state determination unit that determines a display unit that is visually recognizable to a user from among the plurality of display units according to the posture of the case detected by the posture detection unit; and a display data output unit that outputs the display data to the display unit that has been determined as visually recognizable to a user by the visibility state determination unit.

Further, the communication terminal according to a second aspect of the present invention includes the above-described display control device.

Further, the display control method according to a third aspect of the present invention is a display control method that controls output of display data to a plurality of display units that are arranged on different surfaces of a case, including: a posture detection step that detects a posture of the case; a visibility state determination step that determines a display unit that is visually recognizable to a user from among the plurality of display units according to the posture of the case detected at the posture detection step; and a display data output step that outputs the display data to the display unit that has been determined as visually recognizable to the user at the visibility state determination step.

Further, the computer-readable recording medium according to a fourth aspect of the present invention stores a program that causes a computer provided in a display control device that controls output of display data to a plurality of display units that are arranged on different surfaces of a case to function as: a posture detection unit that detects a posture of the case; a visibility state determination unit that determines a display unit that is visually recognizable to a user from among the plurality of display units according to the posture of the case detected by the posture detection unit; and a display data output unit that outputs the display data to the display unit that has been determined as visually recognizable to the user by the visibility state determination unit.

Advantageous Effects of Invention

According to the present invention, information that is desired not to be seen by others can be prevented from being peeked at while maintaining convenience for users.

BRIEF DESCRIPTION OF DRAWINGS

FIG. 1 is a diagram illustrating configurations of a communication terminal according to Exemplary Embodiment 1, in which FIG. 1(a) illustrates the first configuration; FIG. 1(b) illustrates the second configuration; and FIG. 1(c) illustrates the third configuration;

FIG. 3 is a diagram illustrating visibility states of the respective display units according to the posture of the case;

FIG. 4 is a diagram illustrating display items upon receiving a telephone call in a secret mode cancellation state and in a secret mode set state;

FIG. 5 is a diagram illustrating display items upon receiving a mail in a secret mode cancellation state and in a secret mode set state;

FIG. 8 is a diagram illustrating display items displayed on each display unit;

FIG. 9 is a flowchart illustrating display control processing for the third configuration according to Exemplary Embodiment 2;

FIG. 10 is a diagram illustrating display items displayed on each display unit;

DESCRIPTION OF EMBODIMENTS

The following will describe the exemplary embodiments according to the present invention with reference to the drawings.

(Exemplary Embodiment 1)

Figure 1:
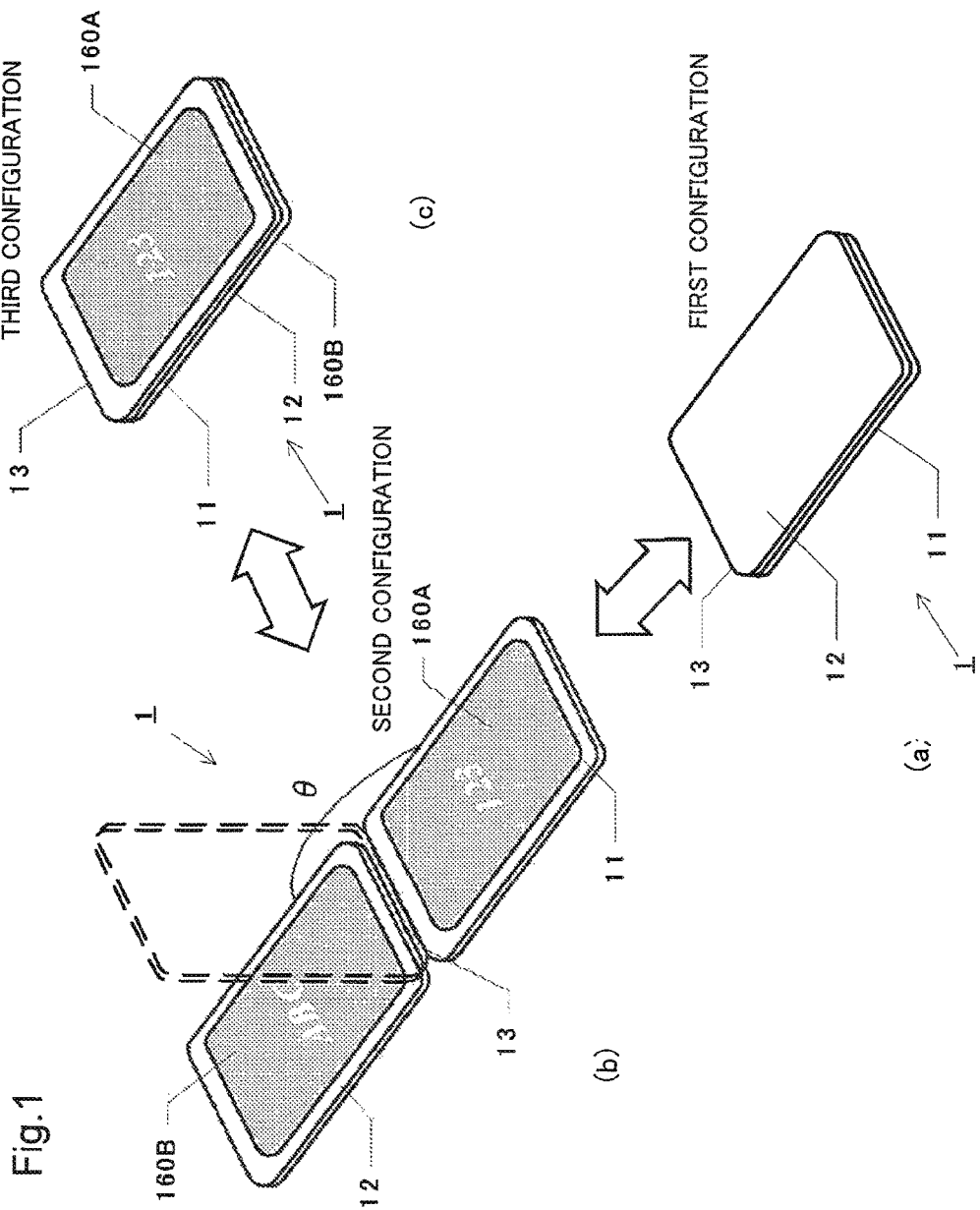

The communication terminal according to Exemplary Embodiment 1 of the present invention is a foldable communication terminal 1 illustrated in FIG. 1. When the secret mode, which will be described later, is set in the communication terminal 1, the communication terminal 1 displays data that is allowed to be visually recognized by a third person on a display unit that is visually recognizable to a user. Further, the communication terminal 1 determines the content of data to be displayed on each display unit equipped on the communication terminal 1 according to the configuration of the communication terminal 1 described later and the posture of a case of the communication terminal 1. The following will describe the details of the communication terminal 1.

The communication terminal 1 is a foldable cell-phone that includes a substantially rectangular first case 11 including a first display unit 160A and a substantially rectangular second case 12 including a second display unit 160B, as illustrated in FIG. 1(b). The first case 11 and the second case 12 are rotatably coupled via a hinge 13 of a single axis mounted on the short sides of the cases. The configurations of the communication terminal 1 can be classified into the first to third configurations according to an angle formed by the first case 11 and the second case 12 (the angle θ illustrated in FIG. 1(b)) which changes in accordance with the rotation of the cases. The following will describe the first to third configurations.

In FIG. 1(a), the communication terminal 1 is closed in a manner the first display unit 160A and the second display unit 160B are in contact with each other, where the angle θ is 0 degree. In this way, when the angle θ is 0°≤θ<45°, the configuration of the communication terminal 1 is the "first configuration". In the first configuration, the first display unit 160A and the second display unit 160B are both hidden. This first configuration is chosen by a user, for example, for storing the communication terminal 1 in a bag or a pocket.

In the communication terminal 1 illustrated in FIG. 1(b), the first case 11 and the second case 12 are unfolded, where the angle θ is 180°. In this way, when the angle θ is 45°≤θ≤180°, the configuration of the communication terminal 1 is the "second configuration". In the second configuration, a user can visually recognize both the first display unit 160A and the second display unit 160B. This second configuration is chosen by a user, for example, when the user uses a telephone function of the communication terminal 1 or creates/browses an e-mail.

In the communication terminal 1 illustrated in FIG. 1(c), the first case 11 and the second case 12 are unfolded until the backs are in contact with each other, where the angle θ is 360°. In this way, when the angle θ is 180°<θ≤360°, the configuration of the communication terminal 1 is the "third configuration". In the third configuration, a user can visually recognize the first display unit 160A and cannot visually recognize the second display unit 160B. The third configuration is chosen by a user, for example, when the user places the communication terminal 1 on a table.

The above-described configurations of the communication terminal 1 are information required to calculate the posture of the communication terminal 1. Therefore, the communication terminal 1 determines the configuration of the communication terminal 1 when calculating the posture of the communication terminal 1 in display control processing as will be described later. Note that the details of the determination method will be described in the description of "configuration determination processing" that will be described later.

Next, the configuration of the communication terminal 1 will be described with reference to FIG. 2.

Figure 2:
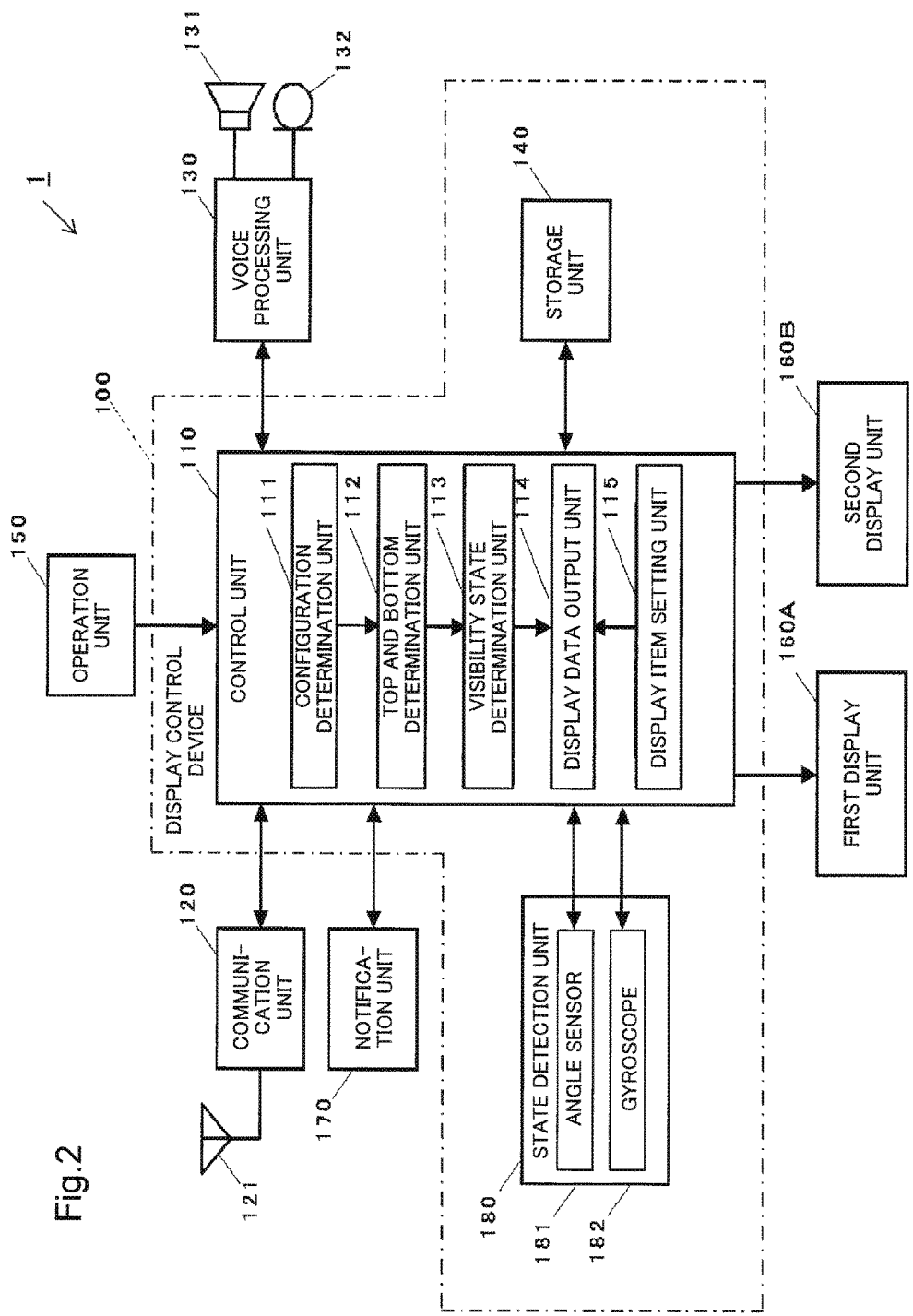
FIG. 2 is a block diagram illustrating a configuration of the communication terminal according to Exemplary Embodiment 1.

As illustrated in FIG. 2, the communication terminal 1 includes: a display control device 100; a communication unit 120; a voice processing unit 130; an operation unit 150; a first display unit 160A; a second display unit 160B; and a notification unit 170.

The display control device 100 includes: a control unit 110; a storage unit 140; and a state detection unit 180.

The control unit 110 includes a CPU (Central Processing Unit) and a RAM (Random Access Memory) that serves as a work area and controls the respective units of the communication terminal 1 by executing an operation program stored in the storage unit 140. Further, the control unit 110 mediates information transfer among the units.

The RAM stores an address book. The address book is written, in advance, for example, data of the respective display items illustrated in FIG. 4 ("incoming call massage", "incoming call time and date", "caller's name", "classification (e.g., family member, client)", "company name/organization name", "department name", "position", "memo") (hereinafter, referred to as the "incoming call display item data") as data for displaying upon receiving an incoming telephone call. The address book is further written, in advance, for example, data of the respective display items illustrated in FIG. 5 ("new mail message", "reception time and date", "sender's name", "classification", "company name/organization name", "department name", "position", "memo", "head of main text") (hereinafter, referred to as the "receiving mail display item data") as data for displaying upon receiving a mail. Provided that data of the "caller's telephone number" among the incoming call display item data and data of "sender's mail address" among the receiving mail display item data are not written in the address book, yet, is supplied by an exchange of a telephone company upon receiving an incoming telephone call or receiving a mail.

The CPU functions as a configuration determination unit 111; a top and bottom determination unit 112; a visibility state determination unit 113; a display data output unit 114; and a display item setting unit 115 by operating in accordance with the operation program stored in the storage unit 140.

The configuration determination unit 111 performs "configuration determination processing" that determines whether the configuration of the communication terminal 1 is any of the first to third configurations based on the angle θ detected by an angle sensor 181 as will be described later.

The top and bottom determination unit 112 performs "top and bottom determination processing" that determines whether the first display unit 160A or the second display unit 160B is the upper side display unit based on the posture of the first case 11 detected by a gyroscope 182 as will be described later, and the configuration of the communication terminal 1 determined by the configuration determination unit 111.

The visibility state determination unit 113 performs "visibility state determination processing" that determines the display unit that is visually recognizable to a user based on the configuration of the communication terminal 1 and the display unit that the top and bottom determination unit 112 has determined as the upper side.

The display data output unit 114 outputs data of display items, such as "incoming call time and date" and "caller's name", as display data to the first display unit 160A and the second display unit 160B.

The display item setting unit 115 sets display/non-display of each display item when the secret mode is set or not set (hereinafter, referred to as setting of display/non-display). For example, when a user inputs setting of display/non-display by operating the touch panel equipped on the first display unit 160A, information that indicates the setting of display/non-display is supplied from the first display unit 160A to the display item setting unit 115. The display item setting unit 115 performs setting of display/non-display based on the supplied information.

The communication unit 120 includes a communication device that uses a predetermined communication method and an antenna 121 that conforms the communication method that the communication device uses, and performs wireless communications with a nearby base station.

The voice processing unit 130 includes a codec circuit for voice data, a speaker 131, and a microphone 132 and performs processing relating to the voice input and output of the communication terminal 1. The voice processing unit 130 performs: call-receiving operation that converts digital voice data received in the communication unit 120 into analogue voice signals and outputs the analogue voice signals from the speaker 131; and call-transmitting operation that converts a spoken voice of a user supplied from the microphone 132 into digital voice data and transmits the digital voice data to the communication unit 120.

The storage unit 140 includes a storage device, such as a flash memory, to store a variety of data in addition to the operation program that the control unit 110 executes.

The operation unit 150 includes a button and the like equipped on the external surface of the first case 11 and receives operation of a user. The operation unit 150 generates input signals according to the operation of a user through an input circuit and the like connected to each button and supplies the input signals to the control unit 110.

The first display unit 160A and the second display unit 160B each includes a display screen and a touch panel arranged over the display screen. The display screen is, for example, an organic EL (Organic Electro-Luminescence) screen or an LCD (Liquid Crystal Display) that includes liquid crystal display elements and displays an image that indicates a variety of information stored in an address book, such as telephone numbers, and information included in an e-mail. The touch panel includes a touch sensor that detects a contact of a finger and a location thereof by a resistive membrane system and, when detecting a contact of a finger, supplies a detection signal that indicates the contact and the contact location to the control unit 110.

The notification unit 170 notifies a reception of an incoming telephone call or a mail to a user and is configured by a vibrator, a sound speaker, an LED (Light Emitting Diode) and the like.

The state detection unit 180 includes an angle sensor 181 that is mounted on the hinge 13 that couples the first case 11 and the second case 12 and a gyroscope 182 that is equipped inside the first case 11.

The angle sensor 181 detects an angle θ formed by the first case 11 and the second case 12 and is configured by a rotary encoder or the like. The angle sensor 181 generates a pulse signal each time the axis of the hinge 13 rotates by a predetermined angle and supplies this pulse signal to the control unit 110. The control unit 110 calculates an angle θ formed by the first case 11 and the second case 12 based on the supplied pulse signal.

The gyroscope 182 detects the posture (inclination with reference to the ground surface) of the first case 11 and is configured by movable electrodes and the like that are arranged in a comb shape. The gyroscope 182 supplies a detection signal according to the change of the capacitance between the movable electrodes to the control unit 110.

In Exemplary Embodiment 1, when an incoming telephone call or a mail is received, the control unit 110 performs "display control processing", as will be described later, so that the telephone number of a caller or the mail address of a sender will not be peeked at by a third person. In the course of performing the "display control processing", the control unit 110 performs "configuration determination processing", "top and bottom determination processing", "visibility state determination processing", and "secret processing". The following will first describe the contents of the "configuration determination processing", "top and bottom determination processing", "visibility state determination processing", and "secret processing" so as to facilitate understanding of the "display control processing".

(Configuration Determination Processing)

The configuration determination unit 111 determines the configuration of the communication terminal 1 based on the angle θ formed by the first case 11 and the second case 12 in the configuration determination processing. The configuration determination unit 111 determines the configuration of the communication terminal 1 as the first configuration when the angle θ is $0°\leq θ<45°$, as the second configuration when the angle θ is $45°\leq θ\leq 180°$, and as the third configuration when the angle θ is $180°<θ\leq 360°$.

(Top and Bottom Determination Processing)

The top and bottom determination unit 112 performs the top and bottom determination processing when the configuration determination unit 111 determines the configuration of the communication terminal 1 as the third configuration. In the top and bottom determination processing, the top and bottom determination unit 112 determines whether the first display unit 160A or the second display unit 160B is the upper side display unit based on the fact that the configuration of the communication terminal 1 is the third configuration and the posture (inclination with reference to the ground surface) of the first case 11 which is detected by the gyroscope 182.

(Visibility State Determination Processing)

The visibility state determination unit 113 performs "visibility state determination processing" that determines the visibility state of the first display unit 160A and the second display unit 160B based on the determination result of the "configuration determination processing" performed by the configuration determination unit 111 and the determination result of the "top and bottom determination processing" performed by the top and bottom determination unit 112. As illustrated in FIG. 3, the visibility state of each display unit is determined based on a combination of the configuration of the communication terminal 1 and the display unit (the first display unit 160A or the second display unit 160B) that has been determined as the upper side by the top and bottom determination unit 112. For example, when the configuration of the communication terminal 1 is determined as the third configuration by the configuration determination unit 111 and the first display unit 160A is determined as the upper side by the top and bottom determination unit 112, the visibility state determination unit 113 determines that the first display unit 160A is visually recognizable to a user (indicated by circle in the second row from the bottom in FIG. 3) and that the second display unit 160B is not visually recognizable to a user (indicated as x in the second row from the bottom in FIG. 3). Further, when the configuration of the communication terminal 1 is determined as the third configuration and the second display unit 160B is determined as the upper side, the visibility state determination unit 113 determines that the first display unit 160A is not visually recognizable to a user (indicated as x in the first row from the bottom in FIG. 3) and that the second display unit 160B is visually recognizable to the user (indicated by circle in the first row from the bottom in FIG. 3).

(Secret Processing)

The secret processing is processing that generates only data of the display items that are allowed by a user to be displayed from among all the display items. When the secret processing is performed, the display data output unit 114 outputs data that is generated in the secret processing as display data to the display unit that is visually recognizable to a user. Note that the execution of the secret processing depends on whether or not the secret mode is set in the communication terminal 1. The following will describe the content of the secret processing.

(a) When an incoming telephone call is received: When an incoming telephone call is received in the secret mode cancellation state, the control unit 110 generates data of all the display items illustrated in FIG. 4 (incoming call display item data). The display data output unit 114 outputs data of all the display items generated by the control unit 110 as display data to the display unit that is visually recognizable to a user. Hereinafter, the secret processing will be described with an assumption that the display unit that is visually recognizable to a user is the first display unit 160A. For example, when display/non-display of display items in the secret mode cancellation state is set as illustrated in FIG. 4, data of all display items ("incoming call massage", "incoming call time and date", "caller's name", "caller's telephone number", "classification", "company name/organization name", "department name", "position", "memo") is output to the first display unit 160A. Note that the data of "caller's telephone number" is supplied from an exchange of the telephone company, and data of other display items is written in advance in the address book.

Further, the control unit 110 generates data of display items as display objects when an incoming telephone call is received in the secret mode set state. In particular, data of display items of which display/non-display is set as "display" among the display items in the secret mode set state illustrated in FIG. 4 is generated (Note that the display/non-display of each display item is set by the display item setting unit 115). This processing is the secret processing. The display data output unit 114 outputs data of the display items generated by the control unit 110 as display data to the first display unit 160A. For example, when the display/non-display of display items in the secret mode set state is set as illustrated in FIG. 4, data of "incoming call massage" that is preset as "display" and data of the display items that are set as "display" from among "incoming call time and date", "caller's name", "caller's telephone number" which can be set as either display or non-display is output as display data to the first display unit 160A. Whereas, as data of "classification", "company name/organization name", "department name", "position", and "memo" is set as "non-display" in the display items, the data is not output to the first display unit 160A.

(b) When a mail is received: When a mail is received in the secret mode cancellation state, the control unit 110 generates data of all the display items illustrated in FIG. 5 (receiving mail display item data). The display data output unit 114 outputs data of all the display items generated by the control unit 110 as display data to the first display unit 160A. For example, when display/non-display of display items in the secret mode cancellation state is set as illustrated in FIG. 5, data of all display items ("new mail message", "reception time and date", "sender's name", "sender's mail address", "classification", "company name/organization name", "department name", "position", "memo", "head of main text") is output to the first display unit 160A. Note that the data of "sender's mail address" is transmitted from an exchange of the telephone company, and data of other display items is written in advance in the address book.

Further, the control unit 110 generates data of display items as display objects when a mail is received in the secret mode set state. In particular, data of display items of which display/non-display is set as "display" is generated among the display items in the secret mode set state illustrated in FIG. 5. The display data output unit 114 outputs data of the display items generated by the control unit 110 as display data to the first display unit 160A. For example, when the display/non-display of display items in the secret mode set state is set as illustrated in FIG. 5, the display data output unit 114 outputs data of "new mail message" and data of display items that are set as "display" from among "reception time and date", "sender's name", "sender's mail address" as display data to the first display unit 160A. Whereas, as data of "classification", "company name/organization name", "department name", "position", "memo", "head of main text" is set as "non-display" in the display items, the data is not displayed on the first display unit 160A.

The control unit 110 performs the above-described "configuration determination processing", "top and bottom determination processing", "visibility state determination processing" and "secret processing" in the course of performing "display control processing" to prevent the telephone number and the like of the caller of the telephone call from being peeked at by others. The following will describe the details of the "display control processing" with reference to FIG. 6.

(Display Control Processing)

The configuration determination unit 111 starts display control processing in response to the reception of an incoming telephone call or a mail, then, controls the angle sensor 181 to detect the angle θ formed by the first case 11 and the second case 12 (step S101). Next, the configuration determination unit 111 determines whether or not the communication terminal 1 is in the first configuration based on the detected angle θ (step S102). If the configuration of the communication terminal 1 is not the first configuration (step S102: No), the configuration determination unit 111 determines whether or not the configuration of the communication terminal 1 is the second configuration (step S103).

If the configuration of the communication terminal 1 is determined as not the second configuration (step S103: No), the configuration determination unit 111 performs "display control processing for the third configuration" (step S107).

Figure 7:
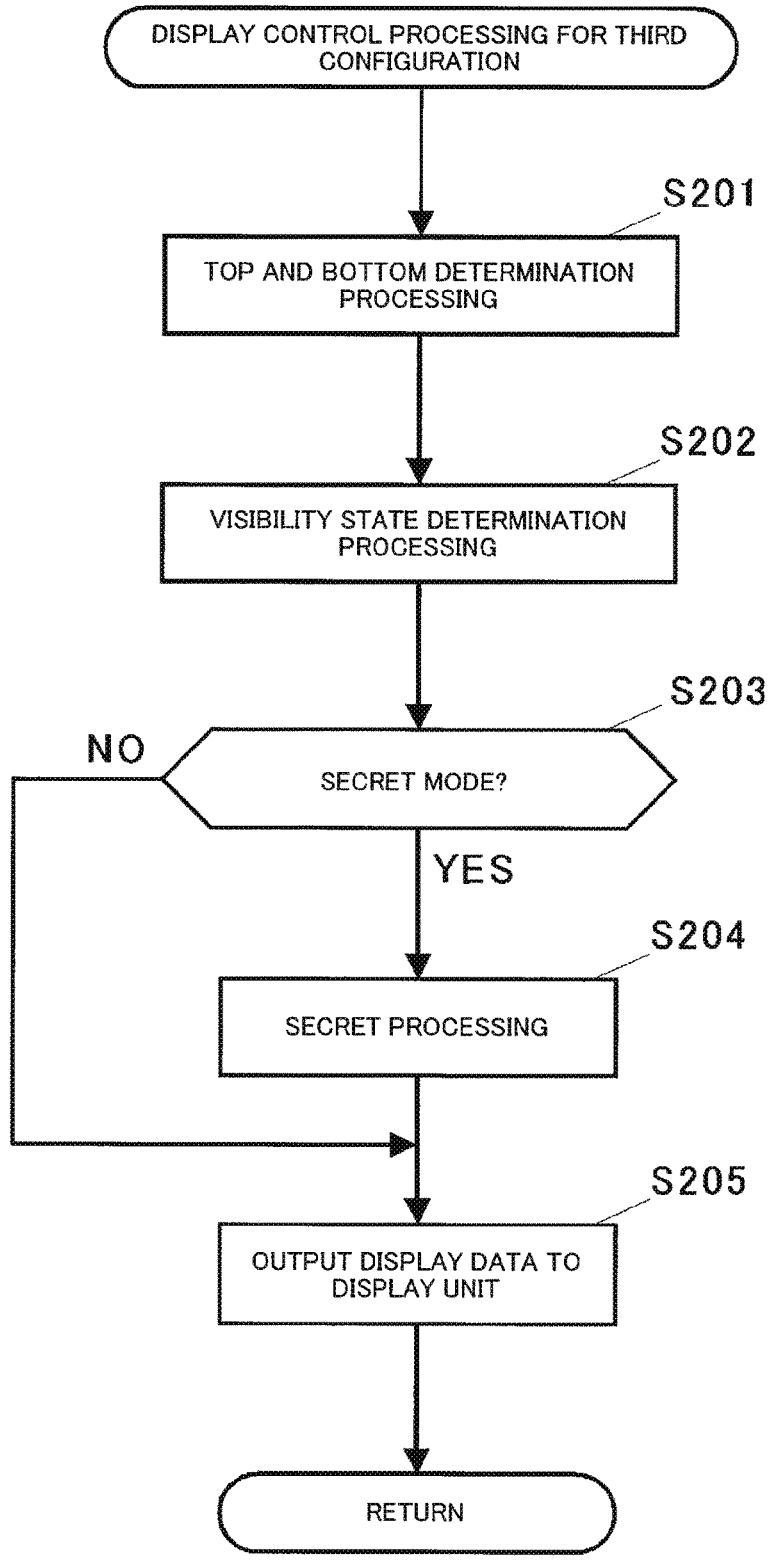
FIG. 7 is a flowchart illustrating display control processing for the third configuration according to Exemplary Embodiment 1.

The following will describe the details of the "display control processing for the third configuration" of step S107 with reference to FIG. 7. Note that the communication terminal 1 is placed on a table in a state where the first display unit 160A is exposed facing upward.

When the display control processing for the third configuration is started, the top and bottom determination unit 112 performs the above-described "top and bottom determination processing" (step S201). Next, the visibility state determination unit 113 performs the above-described "visibility state determination processing" that determines the respective visibility states of the first display unit 160A and the second display unit 160B (step S202).

The control unit 110 determines whether or not the secret mode is set in the communication terminal 1 (step S203). If it is determined that the secret mode is set (step S203: Yes), the control unit 110 performs the secret processing (step S204).

The display data output unit 114 outputs data of the display items that are set as "display" from among all the display items as display data to the first display unit 160A that is visually recognizable to a user according to the setting in the secret mode set state as illustrated in FIG. 4. Further, the display data output unit 114 outputs data of all the display items to the second display unit 160B that is visually recognizable to a user as display data (step S205). As the result, the first display unit 160A and the second display unit 160B display the data of the respective display items as illustrated in FIG. 8. Note that the first display unit 160A corresponds to the upper side display unit and the second display unit 160B corresponds to the lower side display unit.

Figure 6:
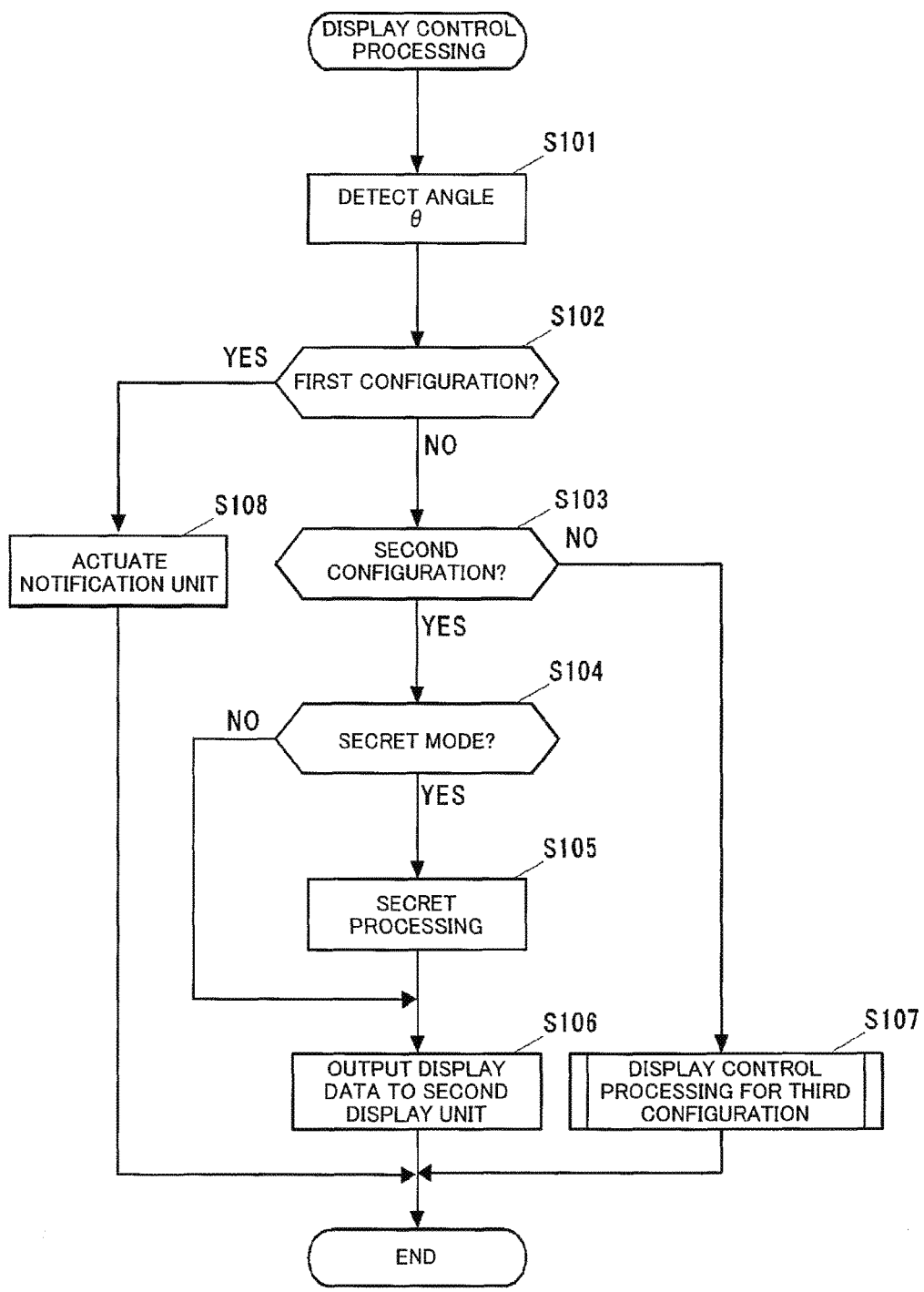
FIG. 6 is a flowchart of display control processing according to Exemplary Embodiment 1.

When the processing of step S205 ends, the control unit 110 returns the control to the display control processing illustrated in FIG. 6 and ends the display control processing for the third configuration.

Note that, if it is determined that the secret mode is not set at step S203 (step S203: No), the control unit 110 skips the secret processing of step S204. Further, if the secret processing is skipped, the display data output unit 114 outputs data of all the display items to the first display unit 160A that is visually recognizable to a user, yet, does not output the display data to the second display unit 160B that is not visually recognizable to a user.

Further, if the configuration of the communication terminal 1 is determined as the first configuration at step S102 (step S102: Yes), the control unit 110 actuates the notification unit 170 (a vibrator, a sound speaker, or an LED) (step S108), maintains the first display unit 160A and the second display unit 160B in an extinguished state, and ends the display control processing.

Further, if the configuration of the communication terminal 1 is determined as the second configuration at step S103 (step S103: Yes), the control unit 110 determines whether or not the secret mode is set in the communication terminal 1 (step S104). If it is determined that the secret mode is set in the communication terminal 1 (step S104: Yes), the control unit 110 performs the secret processing (step S105). Then, the display data output unit 114 outputs the display data to the second display unit 160B according to the setting in the secret mode set state as illustrated in FIG. 4 (step S106) and ends the display control processing.

Further, if it is determined that the secret mode is not set at step S104 (step S104: No), the control unit 110 skips the secret processing of step S105. Further, if the secret processing of step S105 is skipped, the display data output unit 114 outputs data of all the display items as display data to the second display unit 160B.

As described above, according to Exemplary Embodiment 1, when the secret processing is performed, only data of display items that are set as "display" is displayed on the visually recognizable display unit. Therefore, setting only display items of data that is allowed to be seen by others as "display", can prevent the data from being peeked at.

Further, according to Exemplary Embodiment 1, data of all display items can be visually recognized, for example, only by flipping the communication terminal 1. Therefore, convenience for users can be maintained.

(Exemplary Embodiment 2)

In Exemplary Embodiment 1, display data is displayed on the display unit that is not visually recognizable to a user in the secret mode set state. However, in Exemplary Embodiment 2, display data is not displayed on the display unit that is not visually recognizable to a user for saving power. The following will describe the communication terminal 1 according to Exemplary Embodiment 2 with reference to FIGS. 9 and 10.

The configuration of the communication terminal 1 is the same as the configuration of the communication terminal 1 illustrated in FIG. 2. Further, the "display control processing" according to Exemplary Embodiment 2 is the same as the display control processing illustrated in FIG. 6.

However, the "display control processing for the third configuration" is different from the "display control processing for the third configuration" illustrated in FIG. 7. Thus, the following will describe the details of the "display control processing for the third configuration" according to Exemplary Embodiment 2.

When the display control processing for the third configuration is started, the top and bottom determination unit 112 performs "top and bottom determination processing" (step S301). Next, the visibility state determination unit 113 performs "visibility state determination processing" (step S302). Note that, to facilitate understanding, processing after step S303 will be described by assuming it is determined that the first display unit 160A is the display unit that is visually recognizable to a user and the second display unit 160B is the display unit that is not visually recognizable to a user in the visibility state determination processing.

The control unit 110 extinguishes the second display unit 160B that is not visually recognizable to a user (step S303). For example, if the second display unit 160B includes an organic EL screen and a voltage control circuit that applies voltage to the illuminant of the organic EL screen, the control unit 110 causes the power supply to stop supplying power to the illuminant to extinguish the second display unit 160B. Further, if the second display unit 160B includes an LCD, a backlight that illuminates the LCD, and a backlight drive circuit that drives the backlight, the control unit 110 causes the power supply to stop supplying power to LCD, the backlight and the backlight drive circuit to extinguish the second display unit 160B (Note that only the backlight may be extinguished by stopping the power supply to the backlight. Alternatively, the LCD may be displayed in black by stopping the power supply to the LCD.)

Next, the control unit 110 determines whether or not the secret mode is set in the communication terminal 1 (step S304) and, if it is determined that the secret mode is set (step S304: Yes), the control unit 110 performs the secret processing (step S305).

Subsequently, the display data output unit 114 outputs data of the display items that are set as "display" in the secret mode set state, from among the display items illustrated in FIG. 4, as display data to the first display unit 160A that is visually recognizable to a user (step S306).

Note that, if it is determined that the secret mode is not set in the processing of step S304 (step S304: No), the control unit 110 skips the secret processing of step S305. Then, the control unit 110 outputs data of all the display items to the first display unit 160A (step S306).

Further, after the second display unit 160B is extinguished, when the configuration of the communication terminal 1 changes from the third configuration to the second configuration, the control unit 110 lights the second display unit 160B in the processing of step S106 illustrated in FIG. 6.

As described above, in Exemplary Embodiment 2, the display unit that is not visually recognizable to a user is extinguished when the configuration of the communication terminal 1 is the third configuration. As such, the communication terminal 1 according to Exemplary Embodiment 2 has lower energy consumption than the communication terminal 1 according to Exemplary Embodiment 1. Further, when the configuration of the communication terminal 1 is the third configuration, a user cannot visually recognize data of all the display items with the communication terminal 1 set in the secret mode. However, once the secret mode is cancelled, the user can visually recognize data of all the display items. Therefore, convenience for users is maintained without causing inconvenience to users.

(Exemplary Embodiment 3)

In Exemplary Embodiments 1 and 2, there have been described examples of preventing information that is desired not to be seen by others from being peeked at by limiting the display objects on the display unit that is visually recognizable to a user in the secret mode set state to only data of a part of the display items from among all the display items. In Exemplary Embodiment 3, there will be described an example of preventing the display unit that is visually recognizable to a user from being peeked at by making the display unit hardly visible to a third person when the display data is displayed.

Figure 11:
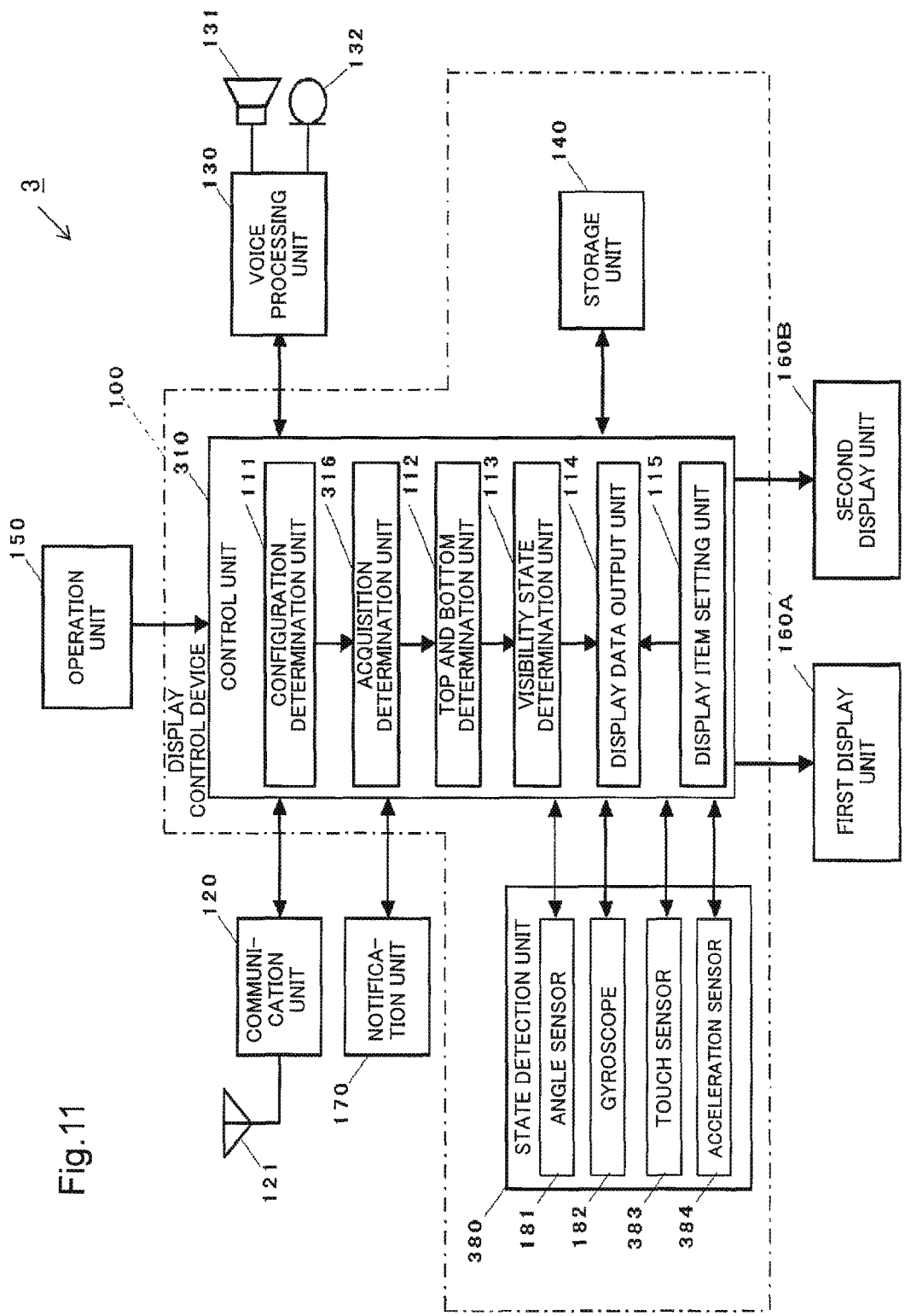
FIG. 11 is a block diagram illustrating a configuration of the communication terminal according to Exemplary Embodiment 3.

As illustrated in FIG. 11, the configuration of a communication terminal 3 according to Exemplary Embodiment 3 is basically the same as the configuration of the communication terminal 1 illustrated in FIG. 2.

Provided that the state detection unit 380 includes a touch sensor 383 that is provided on the exteriors of the first case 11 and the second case 12 and an acceleration sensor 384, in addition to the angle sensor 181 and the gyroscope 182.

When a finger of a user is in contact with the touch sensor 383, the touch sensor 383 supplies a detection signal that indicates a contact of a finger to the control unit 310. Note that the touch sensor 383 may either be, for example, a touch sensor that detects a contact of a finger by a resistive membrane system or a touch sensor that detects a contact of a finger by a capacitive sensing method, as long as the touch sensor can detect a contact of a finger.

The acceleration sensor 384 detects acceleration of the first case 11 and is configured by a movable portion, a stationary portion, and the like. The acceleration sensor 384 supplies detection signals according to the change of the capacitance between the movable portion and the stationary portion to the control unit 310. The control unit 310 calculates the acceleration of the first case 11 based on the supplied detection signals.

Further, the control unit 310 includes an acquisition determination unit 316 in addition to the functions of the control unit 110 illustrated in FIG. 2.

The acquisition determination unit 316 performs "acquisition determination processing" that determines whether or not a user has acquired the communication terminal 3. The following will describe the determination method of this acquisition determination processing.

(Acquisition Determination Processing)

The acquisition determination unit 316 performs the "acquisition determination processing" to determine whether or not a user has started an action of taking the communication terminal 3 in a hand (acquisition action) based on the detection result of the touch sensor 383 and the detection result of the acceleration sensor 384. For example, the acquisition determination unit 316 determines that the acquisition action is started when the touch sensor 383 (a contact detection unit) detects a contact with a finger of a user, as well as, the acceleration sensor 384 detects acceleration of which absolute value (hereinafter, simply referred to as acceleration) is not less than the predetermined acceleration reference value. Whereas, the acquisition determination unit 316 determines that the acquisition action is not started when the touch sensor 383 does not detect a contact with a finger of a user and/or the acceleration of the first case 11 is less than the above-described reference value.

Figure 12:
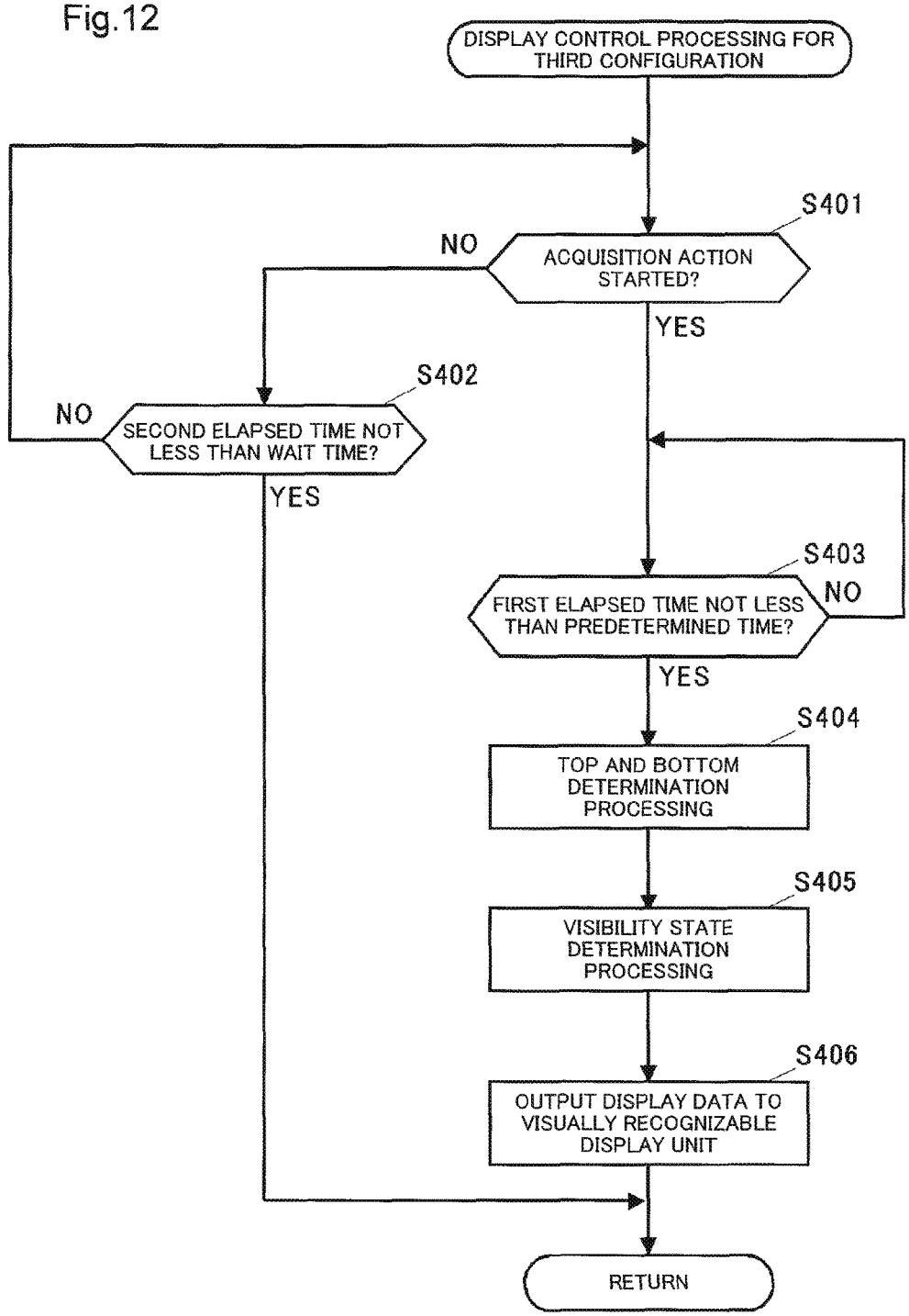
FIG. 12 is a flowchart illustrating display control processing for the third configuration according to Exemplary Embodiment 3.

Next, the "display control processing for the third configuration" according to Exemplary Embodiment 3 will be described with reference to FIG. 12. The "display control processing" is the same as the display control processing illustrated in FIG. 6.

When the display control processing for the third configuration is started, the acquisition determination unit 316 performs the "acquisition determination processing" to determine whether or not an acquisition action is started (step S401).

If the acquisition determination unit 316 determines that an acquisition action is started (step S401: Yes), the control unit 310 acquires present time and stores the present time as the first time in the storage unit 140. Here, the first time represents time when the user starts an acquisition action. Note that the control unit 310 acquires the first time from RTC (Real Time Clock) provided in the communication terminal 3 (thereafter, the same as acquisition of time).

Next, when the control unit 310 acquires present time again (hereinafter, referred to as the second time), the control unit 310 reads the first time from the storage unit 140 and calculates time that has elapsed from the first time until the second time (hereinafter, referred to as the first elapsed time). Then, the control unit 310 (time determination unit) determines whether or not the first elapsed time is not less than predetermined time (e.g., 2 sec) (step S403). If the control unit 310 determines that the first elapsed time is less than the predetermined time (step S403: No), the control unit 310 performs the processing of step S403 again.

If the first elapsed time is determined as not less than the above-described predetermined time (step S403: Yes), the top and bottom determination unit 112 performs "top and bottom determination processing" (step S404).

Next, the visibility state determination unit 113 performs "visibility state determination processing" (step S405).

The display data output unit 114 outputs data of all the display items as display data to the display unit that is visually recognizable to a user (step S406). Then, the display data output unit 114 returns the control to the display control processing illustrated in FIG. 6 and ends the display control processing for the third configuration. Note that, in the processing of step S406, the display data is not output to the lower side display unit that is not visually recognizable to a user.

Further, if it is determined that the acquisition action is not started in the processing of step S401 (step S401: No), the control unit 310 acquires present time (hereinafter, referred to as the third time) and stores the third time in the storage unit 140. Here, the third time represents time when an incoming telephone call or a mail is received. Next, when the control unit 310 acquires present time again (hereinafter, referred to as the fourth time), the control unit 310 reads the third time from the storage unit 140 and calculates time that has elapsed from the third time until the fourth time (hereinafter, referred to as the second elapsed time). Then, the control unit 310 determines whether or not the second elapsed time is not less than predetermined wait time (e.g., 30 sec) (step S402).

When the second elapsed time is determined as less than the above-described wait time in the processing of step S402 (step S402: No), the acquisition determination unit 316 determines again whether or not the acquisition action is started (step S401). If it is determined that an acquisition action is not started in the processing of step S401 (step S401: No), the control unit 310 performs the processing of step S402 again. That is, when the control unit 310 acquires present time as the fourth time and reads the third time from the storage unit 140, the control unit 310 calculates time that has elapsed from the third time until the fourth time (the second elapsed time) and determines whether or not the second elapsed time is not less than predetermined wait time. Note that, if the third time is already stored in the storage unit 140, the control unit 310 does not acquire the third time at step S401.

If the second elapsed time is determined as not less than the above-described wait time (step S402: Yes), the control unit 310 returns the control to the display control processing illustrated in FIG. 6 and ends the display control processing for the third configuration.

As described above, in Exemplary Embodiment 3, display data is displayed on the display unit that is visually recognizable to a user when predetermined time has elapsed since the acquisition action has been started. Therefore, a user can hide the display unit from a third person's eyes before the display data is displayed. Therefore, the communication terminal 3 according to Exemplary Embodiment 3 can prevent information that the user desires not to be seen by others from being peeked at. Further, in Exemplary Embodiment 3, data of all the display items is displayed on the display unit that is visually recognizable to a user. Thus, convenience for users can be maintained.

(Exemplary Embodiment 4)

In Exemplary Embodiment 3, there has been described an example where display data is displayed on the display unit when predetermined time has elapsed since the acquisition action has been started. In this example, the display data might possibly be displayed when predetermined time has elapsed even if the acquisition action has not been completed. Thus, in Exemplary Embodiment 4, there will be described an example of displaying the display data after completing the acquisition action.

The configuration of the communication terminal 3 according to Exemplary Embodiment 4 is the same as the configuration of the communication terminal 3 illustrated in FIG. 11. Further, the "display control processing" according to Exemplary Embodiment 4 is the same as the display control processing illustrated in FIG. 6.

Figure 13:
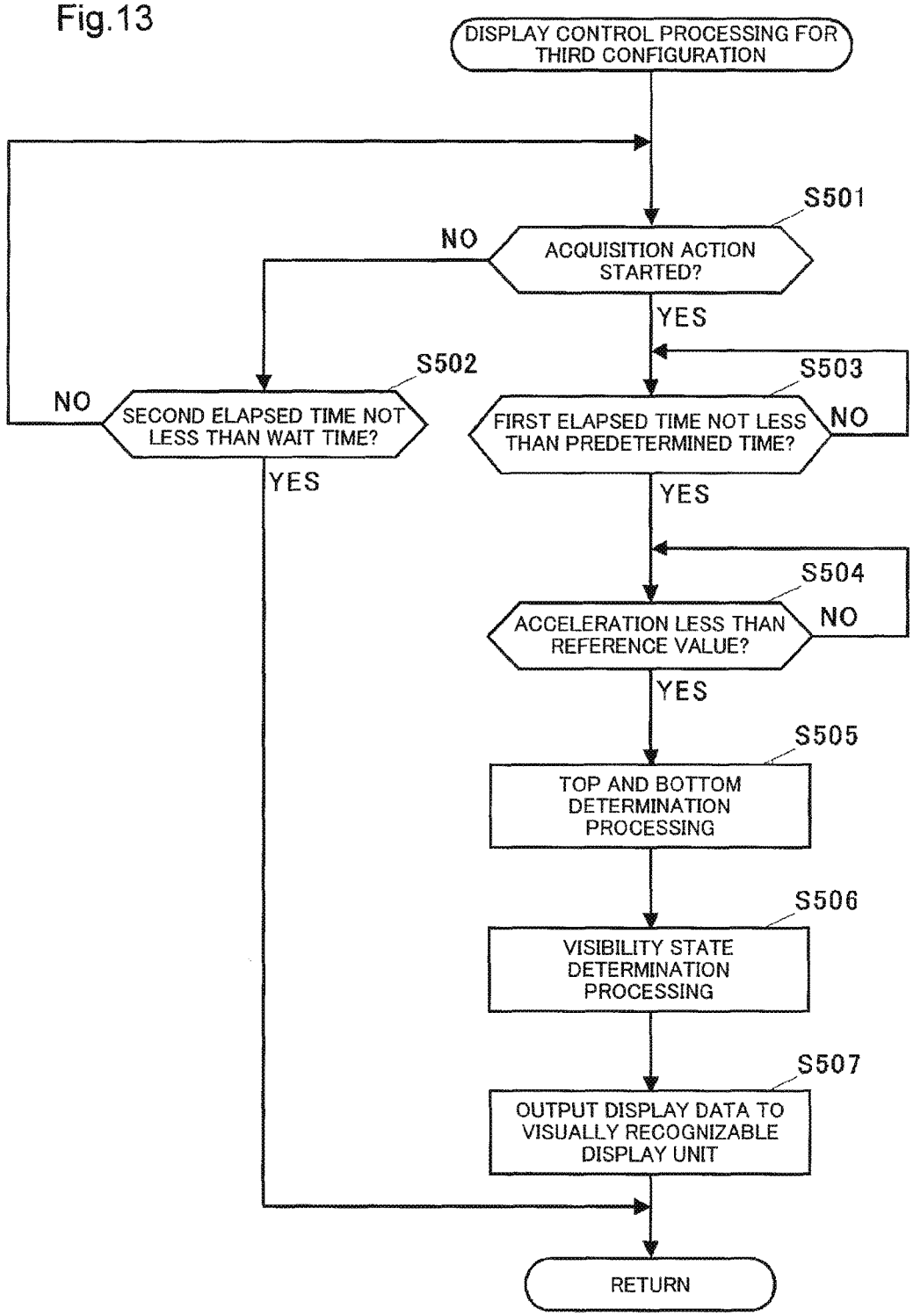
FIG. 13 is a flowchart illustrating display control processing for the third configuration according to Exemplary Embodiment 4.

However, the "display control processing for the third configuration" according to Exemplary Embodiment 4 is different from the "display control processing for the third configuration" according to Exemplary Embodiment 3. In Exemplary Embodiment 4, the "display control processing for the third configuration" determines whether or not acceleration of the first case 11 is less than the predetermined acceleration reference value, when predetermined time or more has elapsed since the acquisition action has been started. Here, for example, if a user takes the communication terminal 3 in a hand and brings it to the front of the face, as the communication terminal 1 rests there, the acceleration of the first case 11 becomes 0 that falls below the above-described reference value. As such, the display data is displayed on the display unit that is visually recognizable to a user by deeming that the acquisition action has been completed at the time when the acceleration of the first case 11 is determined as less than the above reference value. The following will describe the details of the "display control processing for the third configuration" according to Exemplary Embodiment 4 with reference to FIG. 13.

When the display control processing for the third configuration is started, the acquisition determination unit 316 performs the "acquisition determination processing" to determine whether or not an acquisition action has been started (step S501). If it is determined that an acquisition action has been started (step S501: Yes), the control unit 310 acquires present time and stores the present time as the first time in the storage unit 140. Next, when the control unit 310 acquires present time again (the second time), the control unit 310 reads the first time from the storage unit 140 and calculates time that has elapsed from the first time until the second time (the first elapsed time). Then, the control unit 310 determines whether or not the first elapsed time is not less than predetermined time (step S503).

Next, the acquisition determination unit 316 determines whether or not the acceleration detected by the acceleration sensor 384 (acceleration detection unit) is less than the above-described reference value (step S504). If the acquisition determination unit 316 determines that the acceleration is not less than the above-described reference value (step S504: No), the acquisition determination unit 316 performs the processing of step S504 again. Then, if the acquisition determination unit 316 determines that the acceleration is less than the above-described reference value (step S504: Yes), the processing of steps S505 to S507 is performed and, as the result, display data is output to the display unit that is visually recognizable to a user. Note that the processing of steps S505 to S507 is the same processing as steps S404 to S406 illustrated in FIG. 12.

As described above, in Exemplary Embodiment 4, display data is displayed after predetermined time has elapsed since the acquisition action has been started, as well as, the acceleration of the first case 11 becomes less than the reference value. Thus, display data is displayed after the acquisition action has been completed.

(Exemplary Embodiment 5)

Figure 14:
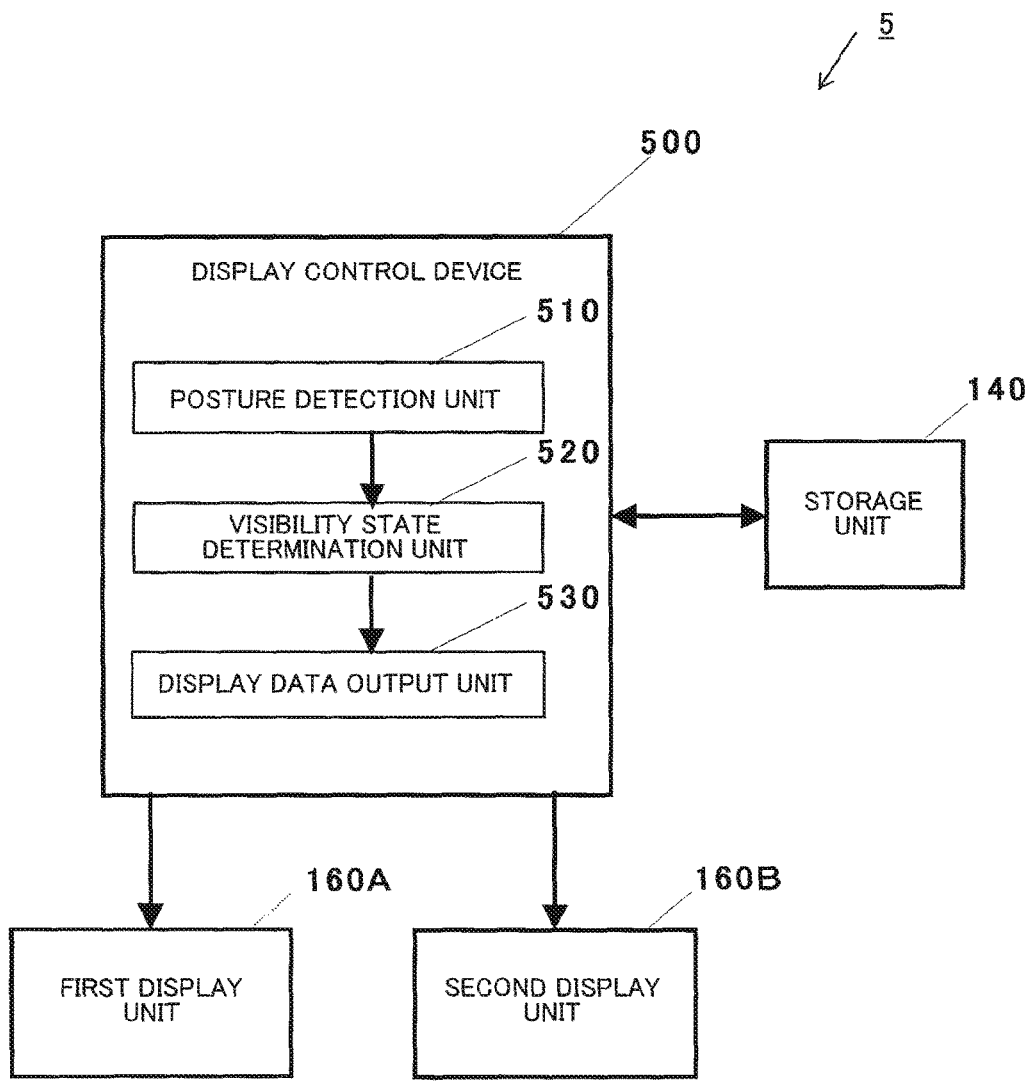
FIG. 14 is a block diagram illustrating a configuration of the display control device according to Exemplary Embodiment 5.

Note that the communication terminal 1 according to Exemplary Embodiments 1 and 2 and the communication terminal 3 according to Exemplary Embodiments 3 and 4 may be configured as illustrated in FIG. 14.

A communication terminal 5 illustrated in FIG. 14 includes: a display control device 500; a storage unit 140; a first display unit 160A; and a second display unit 160B.

The display control device 500 includes a CPU, a RAM that serves as a work area and the like and performs a variety of processing in accordance with the operation program stored in the storage unit 140. The CPU of the display control device 500 functions as a posture detection unit 510, a visibility state determination unit 520, and a display data output unit 530 according to the operation program stored in the storage unit 140.

The posture detection unit 510 detects the posture of a case of the communication terminal 5 illustrated in FIG. 14. The following will describe an example of a method of detecting the posture of the case. The posture detection unit 510 determines whether the configuration of the communication terminal 5 is any of the first to third configurations illustrated in FIGS. 1(*a*) to 1(*c*) based on an angle θ formed by the first case 11 and the second case 12 illustrated in FIG. 1(*b*) detected by an angle sensor. If the posture detection unit 510 determines that the communication terminal 5 is in the third configuration, the posture detection unit 510 determines whether or not the first display unit 160A provided in the first case 11 faces upward based on the inclination of the first case 11 with reference to the ground surface which is detected by a gyroscope. Then, if the first display unit 160A is facing upward, the posture detection unit 510 determines that the first display unit 160A is on a more upper side than the second display unit 160B, while, if the first display unit 160A is facing downward, the posture detection unit 510 determines that the second display unit 160B is on a more upper side than the first display unit 160A. In Exemplary Embodiment 5, the combination of the configuration of the communication terminal 5 and the upper side display unit of the communication terminal 5, which has been determined as above, is referred to as the posture of the case.

The visibility state determination unit 520 determines whether the first display unit 160A or the second display unit 160B is the display unit that is visually recognizable to a user according to the posture of the case detected by the posture detection unit 510.

The display data output unit 530 outputs the display data to the display unit that the visibility state determination unit 520 determined as visually recognizable to the user. The display data is data of display items, such as "incoming call massage", "incoming call time and date", "caller's name", "caller's telephone number", illustrated in FIG. 4.

Figure 15:
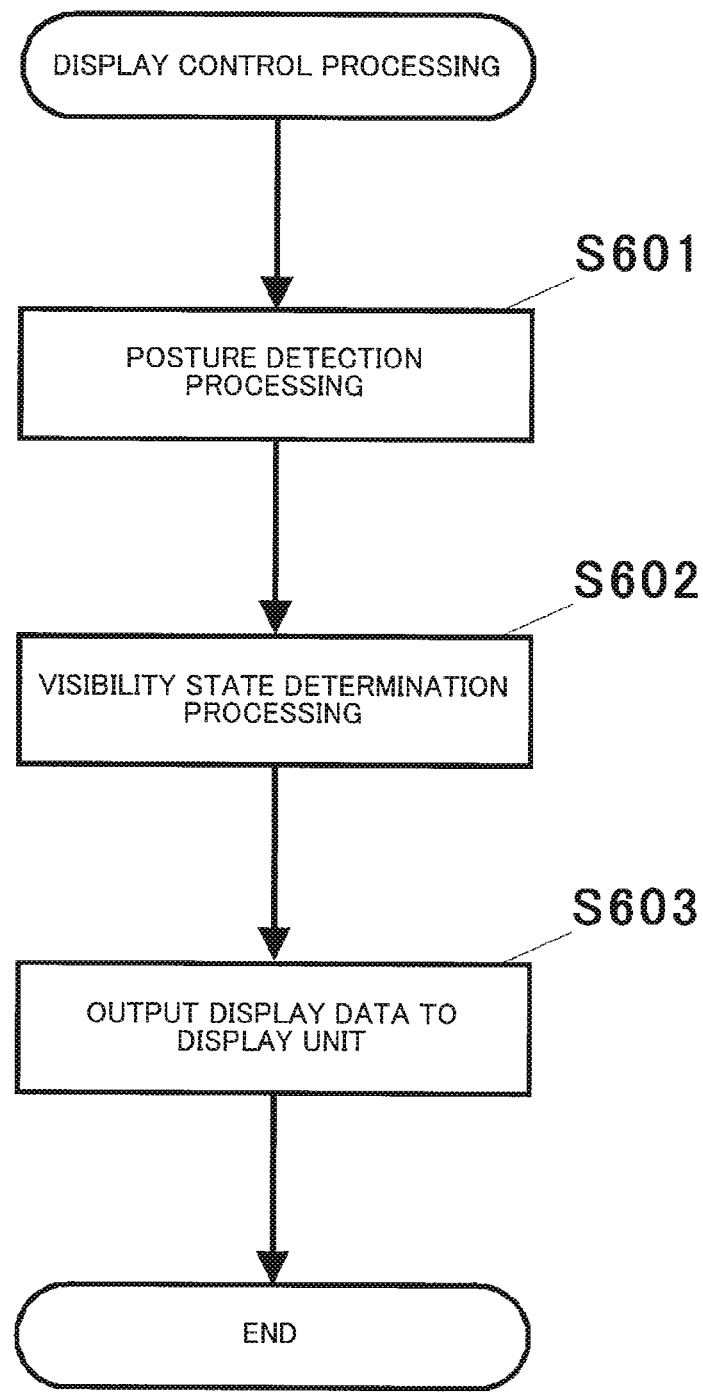
FIG. 15 is a flowchart illustrating display control processing according to Exemplary Embodiment 5.

Next, "display control processing" according to Exemplary Embodiment 5 will be described with reference to FIG. 15.

When the display control processing is started, the posture detection unit 510 performs "posture detection processing" that detects the posture of the case of the communication terminal 5 (step S601).

Next, the visibility state determination unit 520 performs "visibility state determination processing" that determines a display unit that is visually recognizable to a user from among a plurality of display units provided in the communication terminal 5 according to the posture of the case detected by the posture detection unit 510 (step S602).

The display data output unit 530 outputs the display data to the display unit that the visibility state determination unit 520 determined as visually recognizable to the user (step S603).

Even in a configuration as above, the communication terminal 5 can prevent information that is desired not to be seen by others from being peeked at while maintaining convenience for users.

(Variant Example)

Note that the present invention is not limited to those disclosed in Exemplary Embodiments 1 to 5.

In Exemplary Embodiments 1 to 5, a display unit that is visually recognizable to a user is determined according to the posture of the communication terminal 1, 3, 5, although, in addition to this, other appropriate conditions and parameters, such as a light amount that enters the display unit, may be detected so that the display unit that is visually recognizable to a user may be determined according to the detected light amount.

While the communication terminal 1, 3 is foldable in Exemplary Embodiments 1 to -4, as long as a plurality of display units are provided on different surfaces, for example, the communication terminal may be the one, of which cases are detachable and connectable or of which single case has display units on the front surface and the back surface.

In Exemplary Embodiments 1 to 4, the first case 11 and the second case 12 are coupled along the short sides thereof, although, for example, the first case 11 and the second case 12 may otherwise be coupled along the long sides thereof. Further, the shape of the first case 11 and the second case 12 is not restricted to substantially rectangular and, for example, may otherwise be substantially square.

In Exemplary Embodiments 1 to 5, the communication terminal 1, 3, 5 has been described to take the first to third configurations, although the communication terminal may take at least the second and third configurations without restriction to the first to third configurations.

While the state detection unit 180 includes the gyroscope 182 in Exemplary Embodiments 1 to 4, as long as the posture of the case can be detected, a device may be used that detects a light amount that enters into the first display unit 160A to detect the posture of the first case 11 according to the detected light amount.

In Exemplary Embodiments 1 to 4, the configuration determination unit 111 and the angle sensor 181 detect relative locations of a plurality of cases, although means for detecting relative locations of a plurality of cases is not necessarily restricted to those of Exemplary Embodiments 1 to 4. For example, gyroscopes 182 that are mounted on the respective cases may detect relative locations of the respective cases.

While the control unit 110 includes a configuration determination unit 111, a top and bottom determination unit 112, a visibility state determination unit 113, a display data output unit 114, a display item setting unit 115 and the like in Exemplary Embodiments 1 to 4, the respective units may be configured independently from the control unit 110 or a part of the units may be configured independently from the control unit 110.

In Exemplary Embodiments 3 and 4, the state detection unit 180, 380 includes a touch sensor 383, although, as long as the presence or absence of a contact between the case and a user can be detected, the touch sensor 383 may be, for example, the one that includes a button switch that is pressed when a user grabs the case.

While an example where the communication terminal 1, 3, 5 is a cell-phone has been described in the above Exemplary Embodiments 1 to 5, the present invention can be applied to communication terminals other than cell-phones, such as personal computers, electronic organizers, and tablet terminals. Further, the configuration details may be changed as necessary within the scope of the spirit of the present invention.

The major components, such as the control unit 110 and the storage unit 140, may be realized by a dedicated system or by a general computer system. For example, a program for performing the above operation may be stored in a computer-readable recording medium and delivered, then, the program may be installed in a computer to realize the communication terminal 1 that performs the above-described respective processing. Further, such a program may be stored in a disk device provided in a server device on a network, such as the Internet, so that, for example, the program may be downloaded to a computer. Further, the above functions may be realized jointly by the OS (Operating System) and application software. In such a case, only the portion other than OS may be stored in a medium and delivered, or downloaded to a computer.

As for the recording medium that records the above-described program, there may be used an USB (Universal Serial Bus) memory, a flexible disk, a CD (Compact Disc), a DVD (Digital Versatile Disc), a Blu-ray (registered trade mark) Disc, an MO (Magneto Optical Disk), an SD (Secure Digital) card, a memory stick (registered trade mark), and other computer-readable recording media, such as a magnetic disk, an optical disk, a magneto-optical disk, a semiconductor memory, and a magnetic tape.

The present invention can be applied to a variety of embodiments and modifications without departing from the broad sense of the spirit and scope of the present invention. Further, the above-described exemplary embodiments are for description of the present invention and the scope of the present invention is not limited thereto. In other words, the scope of the present invention is specified not by the exemplary embodiments but by the scope of the claims. Thus, a variety of modifications that are implemented within the scope of the claims as well as within the scope of the significance of the equivalent invention are considered as within the scope of the present invention.

INDUSTRIAL APPLICABILITY

A part or whole of the above-described exemplary embodiments can be described as the following Supplementary Notes without limitation.

(Supplementary Note 1)

A display control device that controls output of display data to a plurality of display units that are arranged on different surfaces of a case, including: a posture detection unit that detects a posture of the case; a visibility state determination unit that determines a display unit that is visually recognizable to a user from among the plurality of display units according to the posture of the case detected by the posture detection unit; and a display data output unit that outputs the display data to the display unit that has been determined as visually recognizable to a user by the visibility state determination unit.

(Supplementary Note 2)

The display control device according to Supplementary Note 1, wherein the display data includes data of a plurality of display items, and the display data output unit outputs data of a part of the display items from among the plurality of display items to the display unit that has been determined as visually recognizable to the user and outputs data of all the display items to a display unit that have not been determined as visually recognizable to the user.

(Supplementary Note 3)

The display control device according to Supplementary Note 1, wherein the display data includes data of a plurality of display items, and the display data output unit outputs data of a part of the display items from among the plurality of display items to the display unit that has been determined as visually recognizable to the user, yet, does not output the display data to the display unit that has not been determined as visually recognizable to the user.

(Supplementary Note 4)

The display control device according to Supplementary Note 2 or 3, further including: a display item setting unit that sets for each display item whether to display data of the display item on the display unit that has been determined as visually recognizable to the user.

(Supplementary Note 5)

The display control device according to any one of Supplementary Notes 1 to 4 further including: a time determination unit that calculates elapsed time since the user started an action of taking the case in a hand and determines whether or not the calculated elapsed time is not less than predetermined time, wherein, when the elapsed time is determined as not less than the predetermined time by the time determination unit, the display data output unit outputs the display data to the display unit that has been determined as visually recognizable to the user.

(Supplementary Note 6)

The display control device according to Supplementary Note 5, further including: a contact detection unit that detects a contact between the case and a finger of a user; and an acceleration detection unit that detects acceleration of the case, wherein, when the contact detection unit detects a contact between the case and a finger of a user, as well as, as a result of determining whether or not the acceleration detected by the acceleration detection unit is not less than a predetermined acceleration reference value, the acceleration is determined as not less than the reference value, the time determination unit determines that the user has started the action of taking the case in a hand and starts detecting the elapsed time.

(Supplementary Note 7)

The display control device according to Supplementary Note 6, wherein the time determination unit determines that the user has not started the action of taking the case in a hand when the contact detection unit does not detect a contact between the case and a finger of the user or when the acceleration detected by the acceleration detection unit is less than the reference value, and the display data output unit does not output the display data to the display unit that is determined as visually recognizable to the user when the time determination unit determines that the user has not started the action of taking the case in a hand.

(Supplementary Note 8)

The display control device according to any one of Supplementary Notes 1 to 7, wherein the case is configured by a plurality of cases of which relative locations are changeable and the display control device further includes a case location detection unit that detects the relative locations of the plurality of cases, and the visibility state determination unit determines a display unit that is visually recognizable to a user from among the plurality of display units according to the relative locations of the plurality of cases which have been detected by the case location detection unit.

(Supplementary Note 9)

A communication terminal including: the display control device according to any one of Supplementary Notes 1 to 8.

(Supplementary Note 10)

A display control method that controls output of display data to a plurality of display units that are arranged on different surfaces of a case, including: a posture detection step that detects a posture of the case; a visibility state determination step that determines a display unit that is visually recognizable to a user from among the plurality of display units according to the posture of the case detected at the posture detection step; and a display data output step that outputs the display data to the display unit that has been determined as visually recognizable to the user at the visibility state determination step.

(Supplementary Note 11)

The display control method according to Supplementary Note 10, wherein the display data includes data of a plurality of display items, and the display data output step outputs data of a part of the display items from among the plurality of display items to the display unit that has been determined as visually recognizable to the user and outputs the data of all the display items to the display unit that has not been determined as visually recognizable to the user.

(Supplementary Note 12)

The display control method according to Supplementary Note 10, wherein the display data includes data of a plurality of display items, and the display data output step outputs data of a part of the display items from among the plurality of display items to the display unit that has been determined as visually recognizable to the user, yet, does not output the display data to the display unit that has not been determined as visually recognizable to the user.

(Supplementary Note 13)

A computer-readable recording medium storing a program that causes a computer provided in a display control device that controls output of display data to a plurality of display units that are arranged on different surfaces of a case to function as: a posture detection unit that detects a posture of the case; a visibility state determination unit that determines a display unit that is visually recognizable to a user from among the plurality of display units according to the posture of the case detected by the posture detection unit; and a display data output unit that outputs the display data onto the display unit that has been determined as visually recognizable to the user by the visibility state determination unit.

The present invention is based on Japanese Patent Application No 2012-192220 that was filed as of Aug. 31, 2012. The description, claims, drawings of Japanese Patent Application No 2012-192220 are incorporated in its entirety herein by reference.

REFERENCE SIGNS LIST 1, 3, 5 Communication terminal
11 First case
12 Second case
13 Hinge
100, 500 Display control device
110, 310 Control unit
120 Communication unit
121 Antenna
130 Voice processing unit
131 Speaker
132 Microphone
140 Storage unit
150 Operation unit
160a First display unit
160b Second display unit
170 Notification unit
180, 380 State detection unit
181 Angle sensor
182 Gyroscope
111 Configuration determination unit
112 Top and bottom determination unit
113 Visibility state determination unit
114 Display data output unit
115 Display item setting unit
383 Touch sensor
384 Acceleration sensor
316 Acquisition determination unit
510 Posture detection unit
520 Visibility state determination unit
530 Display data output unit

What is claimed is:

1. A display control device that controls output of display data to a plurality of display units that are arranged on different surfaces of a case, comprising:
a posture detection unit that detects a posture of the case;
a visibility state determination unit that determines a display unit that is visually recognizable to a user from among the plurality of display units according to the posture of the case detected by the posture detection unit;
a display data output unit that outputs the display data to the display unit that has been determined as visually recognizable to a user by the visibility state determination unit; and
a time determination unit that calculates elapsed time since the user started an action of taking the case in a hand and determines whether or not the calculated elapsed time is not less than a predetermined time, wherein, when the elapsed time is determined as not less than the predetermined time by the time determination unit, the display data output unit outputs the display data to the display unit that has been determined as visually recognizable to the user,
the display control device further comprising: a contact detection unit that detects a contact between the case and a finger of a user; and an acceleration detection unit that detects acceleration of the case, wherein, when the contact detection unit detects a contact between the case and a finger of a user, as well as, as a result of determining whether or not the acceleration detected by the acceleration detection unit is not less than a predetermined acceleration reference value, the acceleration is determined as not less than the reference value, the time determination unit determines that the user has started the action of taking the case in a hand and starts detecting the elapsed time.

2. The display control device according to claim 1, wherein the time determination unit determines that the user has not started the action of taking the case in a hand when the contact detection unit does not detect a contact between the case and a finger of the user or when the acceleration detected by the acceleration detection unit is less than the reference value, and the display data output unit does not output the display data to the display unit that is determined as visually recognizable to the user when the time determination unit determines that the user has not started the action of taking the case in a hand.

* * * * *